United States Patent
Seenappa et al.

(10) Patent No.: US 10,721,154 B2
(45) Date of Patent: Jul. 21, 2020

(54) VIRTUAL PROBES

(71) Applicant: AT&T INTELLECTUAL PROPERTY I, L.P., Atlanta, GA (US)

(72) Inventors: Vikram Seenappa, Sammamish, WA (US); Vivek Mhatre, Bellevue, WA (US); Ryan Redfern, Cerritos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 786 days.

(21) Appl. No.: 14/737,698

(22) Filed: Jun. 12, 2015

(65) Prior Publication Data
US 2016/0366041 A1    Dec. 15, 2016

(51) Int. Cl.
*H04L 12/26* (2006.01)
*H04L 12/46* (2006.01)
*H04L 12/24* (2006.01)

(52) U.S. Cl.
CPC .......... *H04L 43/12* (2013.01); *H04L 12/4641* (2013.01); *H04L 41/0806* (2013.01)

(58) Field of Classification Search
CPC .. H04L 43/12; H04L 41/0806; H04L 12/4641
USPC ...................................................... 709/224
See application file for complete search history.

(56) References Cited

U.S. PATENT DOCUMENTS

| | | | |
|---|---|---|---|
| 7,096,263 B2 | 8/2006 | Leighton et al. | |
| 7,213,264 B2 | 5/2007 | Poletto et al. | |
| 7,941,556 B2 | 5/2011 | Canali et al. | |
| 8,018,943 B1* | 9/2011 | Pleshek ................. | H04L 43/028 370/254 |
| 8,098,677 B1* | 1/2012 | Pleshek ................... | H04L 43/12 370/351 |
| 8,611,343 B2 | 12/2013 | Gerber et al. | |
| 8,612,599 B2 | 12/2013 | Tung et al. | |
| 8,661,125 B2 | 2/2014 | Avner et al. | |
| 8,879,397 B2 | 11/2014 | Xi et al. | |
| 8,948,183 B2 | 2/2015 | Lott | |
| 8,949,676 B2 | 2/2015 | Behrendt et al. | |
| 2006/0085530 A1* | 4/2006 | Garrett ................ | G06F 11/3495 709/223 |
| 2008/0052394 A1* | 2/2008 | Bugenhagen ........... | H04L 12/14 709/224 |
| 2009/0037496 A1* | 2/2009 | Chong ................ | G06F 11/0709 |
| 2009/0293056 A1* | 11/2009 | Ferris .................... | G06F 9/5077 718/1 |
| 2009/0299920 A1* | 12/2009 | Ferris .................... | G06Q 10/06 705/418 |

(Continued)

*Primary Examiner* — Abdullahi E Salad
(74) *Attorney, Agent, or Firm* — Hartman & Citrin LLC (57) ABSTRACT

Concepts and technologies are disclosed herein for virtual probes. A processor can execute a probe orchestrator service. The processor can obtain traffic monitoring data that describes traffic associated with a logical node. The logical node can include two or more devices that can exchange information as internal traffic. The processor can analyze the traffic monitoring data to determine one of the two or more devices hosts external traffic that involves an external device that resides outside of the logical node. In response to a determination that the one of the two or more devices hosts the external traffic, the processor can trigger instantiation of a virtual probe at the device of the plurality of devices.

17 Claims, 5 Drawing Sheets

(56) References Cited

U.S. PATENT DOCUMENTS

| | | | |
|---|---|---|---|
| 2009/0300149 A1* | 12/2009 | Ferris | G06F 15/177 709/222 |
| 2012/0124197 A1* | 5/2012 | Ghai | H04L 43/04 709/224 |
| 2013/0007261 A1* | 1/2013 | Dutta | G06F 11/3006 709/224 |
| 2013/0058248 A1 | 3/2013 | Singh et al. | |
| 2013/0086203 A1* | 4/2013 | Avner | G06F 11/3495 709/217 |
| 2013/0268650 A1 | 10/2013 | Faitelson et al. | |
| 2013/0325924 A1 | 12/2013 | Moshfeghi | |
| 2014/0047106 A1* | 2/2014 | Leung | H04L 43/08 709/224 |
| 2014/0229605 A1 | 8/2014 | Besser | |
| 2014/0269380 A1* | 9/2014 | Rusak | H04L 43/0811 370/252 |
| 2014/0280338 A1* | 9/2014 | Metz | H04L 41/0853 707/774 |
| 2015/0067403 A1 | 3/2015 | Naseh et al. | |
| 2015/0188780 A1* | 7/2015 | Spieser | H04L 41/5009 370/252 |
| 2015/0278219 A1* | 10/2015 | Phipps | G06F 16/951 707/711 |
| 2016/0094418 A1* | 3/2016 | Raney | H04L 43/028 370/241 |
| 2016/0173357 A1* | 6/2016 | Stokking | H04L 41/04 370/252 |
| 2016/0197799 A1* | 7/2016 | Clemm | H04L 43/06 709/202 |
| 2016/0197936 A1* | 7/2016 | Drangula | H04L 43/062 726/1 |
| 2016/0255103 A1* | 9/2016 | Yao | G06F 9/45558 726/23 |
| 2016/0261482 A1* | 9/2016 | Mixer | H04L 43/12 |
| 2016/0277249 A1* | 9/2016 | Singh | H04L 67/02 |
| 2016/0294648 A1* | 10/2016 | Fowler | H04L 43/028 |
| 2016/0294658 A1* | 10/2016 | Fowler | H04L 43/0894 |
| 2016/0294665 A1* | 10/2016 | Fowler | H04L 43/12 |
| 2016/0357587 A1* | 12/2016 | Yadav | H04L 63/1425 |

\* cited by examiner

VIRTUAL PROBES

BACKGROUND

Recently, there has been a move toward virtualization of certain types of network functionality. In some of these virtualization approaches, common off the shelf ("COTS") hardware can be used to host virtual machines that can execute software to provide functionality associated with certain applications or services. Thus, specialized hardware and software can be replaced by generic hardware that can execute specialized software modules.

In some instances, traffic associated with virtualized services may be important for analysis and/or network security purposes, among other purposes. To capture data associated with the traffic, a probe can be created to capture all traffic that passes through a physical interface of the COTS hardware (e.g., a server), or any data that leaves or arrives at a data center may be captured. In either of these approaches, some of the data captured may or may not be useful to analysts for various reasons.

SUMMARY

The present disclosure is directed to virtual probes. A logical node of resources such as data center servers can be created or dedicated to provide particular functionality (e.g., a cloud service, a data center, an application, a system, combinations thereof, or the like). The logical node can include at least one server that can create, receive, and/or otherwise engage in communications (e.g., traffic) that leaves the logical node. As such, the logical node can include at least one data center server (and in some embodiments, multiple data center servers) that can be involved in external traffic. In some embodiments, the logical node can include at least two data center servers. The data center servers can exchange internal traffic and at least one of the data center servers, can be involved in the external traffic. According to various embodiments, the external traffic can involve at least one resource that is remote from the logical node such as, for example, the external resource.

A traffic monitor can monitor traffic that involves the logical node in any way. As such, the traffic monitor can monitor the internal traffic and the external traffic. In some other embodiments, a device within the logical node can monitor the traffic associated with the logical node. Regardless of what entity monitors the traffic, traffic monitoring data can be generated by the entity and provided to a device that hosts a probe orchestrator service, for example the server computer. The probe orchestrator service can analyze the traffic monitoring data and determine that a virtual probe is to be instantiated to capture the external traffic associated with the logical node.

The probe orchestrator service can generate or trigger generation of one or more commands to instantiate a virtual probe within the logical node. According to various embodiments of the concepts and technologies described herein, the virtual probe can be instantiated within a host OS of the data center server that is involved in external traffic that leaves the logical node. It should be understood that this example is illustrative and therefore should not be construed as being limiting in any way. The resource that receives the command, or a resource specified by the command, can instantiate the virtual probe. The virtual probe can monitor the external traffic, package information relating to the external traffic as external traffic data, and provide the external traffic data to a recipient such as the probe orchestrator service or an external data recipient.

According to one aspect of the concepts and technologies disclosed herein, a method is disclosed. The method can include obtaining, at a processor executing a probe orchestrator service, traffic monitoring data. The traffic monitoring data can describe traffic associated with a logical node. The logical node can include two or more devices that can exchange information as internal traffic. The method also can include analyzing, by the processor, the traffic monitoring data to determine if a device of the two or more devices hosts external traffic that involves an external device that resides outside of the logical node. The method also can include in response to a determination that the device of the two or more devices hosts the external traffic, triggering, by the processor, instantiation of a virtual probe at the device of the two or more devices.

In some embodiments, the virtual probe can be instantiated at the device. The virtual probe can be hosted by a host operating system of the device. In some embodiments, the method also can include configuring the virtual probe. Configuring the virtual probe can include accessing a catalog of known logical interface descriptions of physical network interfaces of the device; and configuring the virtual probe using the catalog. In some embodiments, the logical node can provide functionality associated with a service and the logical node can be located within a data center.

In some embodiments, the traffic monitoring data can be obtained from a traffic monitor that monitors the two or more devices. In some embodiments, the device exchanges data with an external resource that can be located outside of the logical node. In some embodiments, the method also can include receiving external traffic data from the virtual probe. The external traffic data can describe the external traffic. In some embodiments, the method also can include configuring the virtual probe by issuing a command to the device. In some embodiments, the device can include a data center server.

According to another aspect of the concepts and technologies disclosed herein, a system is disclosed. The system can include a processor and a memory. The memory can store computer-executable instructions that, when executed by the processor, cause the processor to perform operations. The operations can include obtaining traffic monitoring data that describes traffic associated with a logical node, where the logical node can include two or more devices that exchange information as internal traffic; analyzing the traffic monitoring data to determine if a device of the two or more devices hosts external traffic that involves an external device that resides outside of the logical node; and in response to a determination that the device of the two or more devices hosts the external traffic, triggering instantiation of a virtual probe at the device of the two or more devices.

In some embodiments, the virtual probe can be instantiated at the device, and the virtual probe can be hosted by a host operating system of the device. In some embodiments, the computer-executable instructions, when executed by the processor, cause the processor to perform additional operations. The additional operations can include configuring the virtual probe, and configuring the virtual probe can include accessing a catalog of known logical interface descriptions of physical network interfaces of the device; and configuring the virtual probe using the catalog.

In some embodiments, the computer-executable instructions, when executed by the processor, can cause the processor to perform additional operations that can include receiving external traffic data from the virtual probe. The external traffic data can describe the external traffic. In some embodiments, the computer-executable instructions, when executed by the processor, can cause the processor to perform additional operations that can include configuring the virtual probe by issuing a command to the device.

According to yet another aspect, a computer storage medium is disclosed. The computer storage medium can have computer-executable instructions stored thereon that, when executed by a processor, cause the processor to perform operations. The operations can include obtaining traffic monitoring data that describes traffic associated with a logical node, where the logical node can include two or more devices that exchange information as internal traffic; analyzing the traffic monitoring data to determine if a device of the two or more devices hosts external traffic that involves an external device that resides outside of the logical node; and in response to a determination that the device of the two or more devices hosts the external traffic, triggering instantiation of a virtual probe at the device of the two or more devices.

In some embodiments, the virtual probe can be instantiated at the device, and the virtual probe can be hosted by a host operating system of the device. In some embodiments, the computer-executable instructions, when executed by the processor, cause the processor to perform additional operations. The additional operations can include configuring the virtual probe, and configuring the virtual probe can include accessing a catalog of known logical interface descriptions of physical network interfaces of the device; and configuring the virtual probe using the catalog.

In some embodiments, the computer-executable instructions, when executed by the processor, can cause the processor to perform additional operations that can include receiving external traffic data from the virtual probe. The external traffic data can describe the external traffic. In some embodiments, the computer-executable instructions, when executed by the processor, can cause the processor to perform additional operations that can include configuring the virtual probe by issuing a command to the device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to virtual probes. A logical node of resources such as data center servers can be created or dedicated to provide particular functionality (e.g., a cloud service, a data center, an application, a system, combinations thereof, or the like). The logical node can include at least one server that can create, receive, and/or otherwise engage in communications (e.g., traffic) that leaves the logical node. As such, the logical node can include at least one data center server that can be involved in external traffic. In some embodiments, the logical node can include at least two data center servers. The data center servers can exchange internal traffic and at least one of the data center servers, can be involved in the external traffic. According to various embodiments, the external traffic can involve at least one resource that is remote from the logical node such as, for example, the external resource.

A traffic monitor can monitor traffic that involves the logical node in any way. As such, the traffic monitor can monitor the internal traffic and the external traffic. In some other embodiments, a device within the logical node can monitor the traffic associated with the logical node. Regardless of what entity monitors the traffic, traffic monitoring data can be generated by the entity and provided to a device that hosts a probe orchestrator service, for example the server computer. The probe orchestrator service can analyze the traffic monitoring data and determine that a virtual probe is to be instantiated to capture the external traffic associated with the logical node.

The probe orchestrator service can generate or trigger generation of one or more commands to instantiate a virtual probe within the logical node. According to various embodiments of the concepts and technologies described herein, the virtual probe can be instantiated within a host OS of the data center server that is involved in external traffic that leaves the logical node. It should be understood that this example is illustrative and therefore should not be construed as being limiting in any way. The resource that receives the command, or a resource specified by the command, can instantiate the virtual probe. The virtual probe can monitor the external traffic, package information relating to the external traffic as external traffic data, and provide the external traffic data to a recipient such as the probe orchestrator service or an external data recipient.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
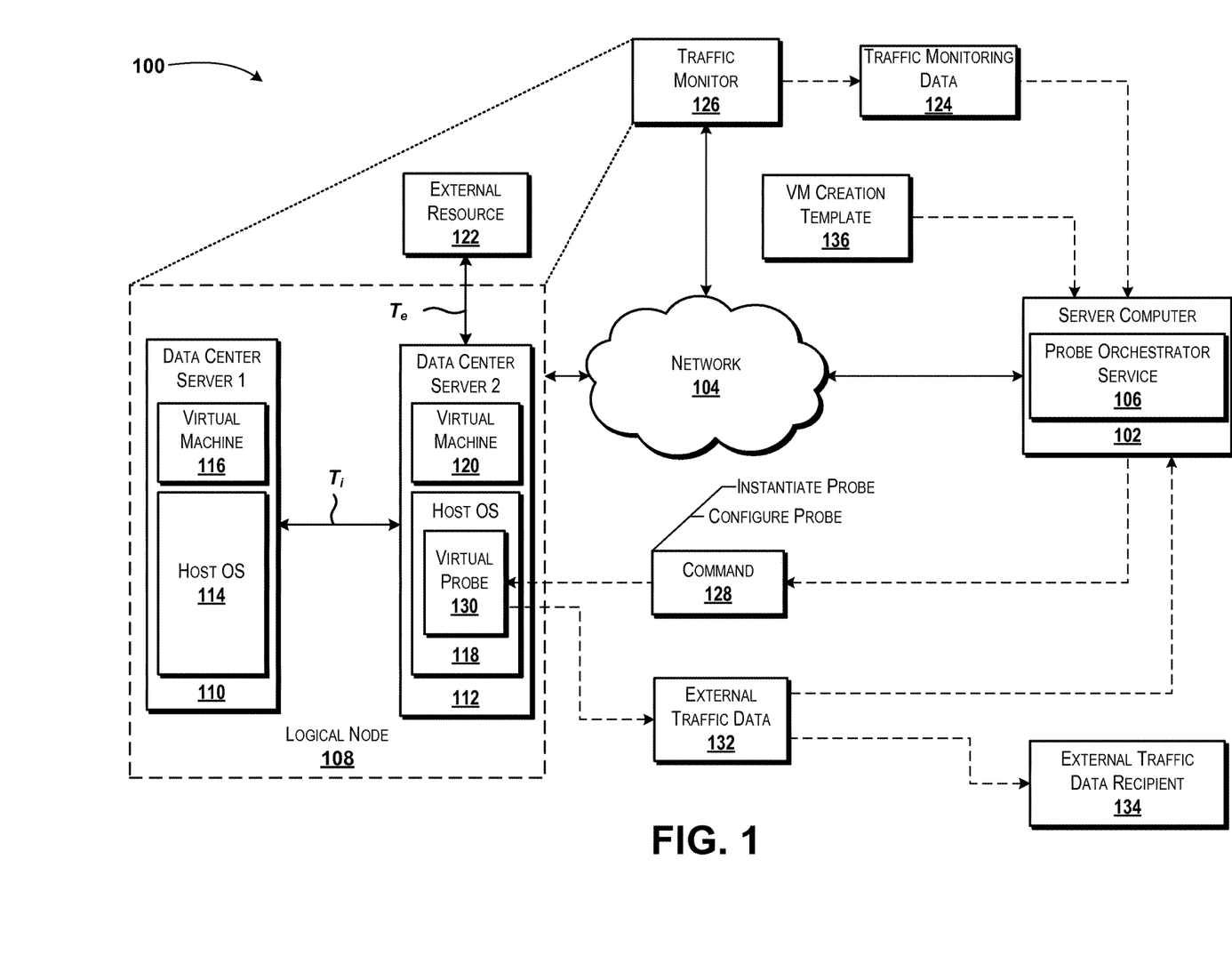
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for creating and using virtual probes will be described, according to an illustrative embodiment. The operating environment 100 shown in FIG. 1 includes a server computer 102. The server computer 102 can operate in communication with and/or as part of a communications network ("network") 104. Additional details of the network 104 are illustrated and described below with reference to FIG. 3.

According to various embodiments, the functionality of the server computer 102 may be provided by one or more server computers, desktop computers, mobile telephones, laptop computers, set-top boxes, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a single server computer having a processor and a memory (illustrated and described with reference to FIG. 4). It should be understood that this embodiment is illustrative, and should not be construed as being limiting in any way.

The server computer 102 can execute an operating system (not shown in FIG. 1) and one or more application programs such as, for example, an probe orchestrator service 106. The operating system can include a computer program that can control the operation of the server computer 102. The probe orchestrator service 106 can include an executable application configured to execute on top of the operating system to provide various functions illustrated and described herein for creating, configuring, and using virtual probes. The functionality of the probe orchestrator service 106 will be further described below after further description of the operating environment 100.

The operating environment 100 also can include a logical node of devices or entities within a data center ("logical node") 108. In the illustrated embodiment shown in FIG. 1, the logical node 108 includes two servers of the data center (not separately labeled in FIG. 1), namely a first data center server (labeled "Data Center Server 1" in FIG. 1) 110 and a second data center server (labeled "Data Center Server 2" in FIG. 1) 112. It should be understood that the data center servers 110, 112 can be substantially identical to one another, though as explained below these data center servers 110, 112 may host different types of traffic and/or perform different functions. As such, the use of different reference numerals for the data center servers 110, 112 is for purposes of convenience and clarity and should not be construed as being limiting in any way.

Furthermore, it should be understood that the logical node 108 can include any number of devices such as servers, data storage devices, processors, and/or other resources. In some embodiments, for example, the logical node 108 can include a single resource while in some other embodiments, the logical node 108 can include tens, hundreds, or even more resources. Thus, the illustrated embodiment showing two data center servers 110, 112 should be understood as being illustrative of one contemplated embodiment and should not be construed as being limiting in any way.

In the illustrated embodiment, the first data center server 110 includes a host operating system ("host OS") 114. The host OS 114 can control the operation of the first data center server 110. The first data center server 110 also can include a virtual machine 116. The virtual machine 116 can provide almost any functionality associated with a particular application, service, or other aspect of the logical node 108. Because the functionality of virtual machines is generally understood, the general functionality of the virtual machine 116 is not further described herein. For purposes of this description, however, it should be understood that the virtual machine 116 provides part of the functionality associated with the logical node 108. It should be understood that this example is illustrative and therefore should not be construed as being limiting in any way.

The second data center server 112 also includes a host operating system ("host OS") 118. The host OS 118 can control the operation of the second data center server 112. The second data center server 112 also can include a virtual machine 120. The virtual machine 120 can provide another part of the functionality associated with the logical node 108. For purposes of the illustrated and described embodiments, the virtual machine 120 does not provide redundancy for the virtual machine 116. Rather, the virtual machine 120 provides a function that differs, at least partially, with respect to the virtual machine 116, as will become apparent with reference to the illustration and description of the concepts and technologies described hereinbelow. It should be understood that this example is illustrative and therefore should not be construed as being limiting in any way.

As shown in FIG. 1, the data center servers 110, 112 can exchange with one another internal node traffic ("internal traffic") $T_i$. As used herein, the term "internal" when used to describe traffic can be used to refer to traffic that can be internal to the logical node 108. Thus, the internal traffic $T_i$ can include, but is not limited to, node-internal messaging traffic, and the like, for the data center servers 110, 112. According to various embodiments of the concepts and technologies described herein, capturing and/or monitoring the internal traffic $T_i$ can be a waste of resources. For example, computing and bandwidth resources expended to capture internal messaging and/or other internal traffic such as the internal traffic $T_i$ may be wasted as such traffic may be safe and unworthy of capturing and/or monitoring. Furthermore, the internal traffic $T_i$ may include proprietary node-internal communications of platform vendors and may not be of any interest to an entity that requests or is entitled to monitored and/or filtered traffic. According to various embodiments of the concepts and technologies described herein, the probe orchestrator service 106 can be configured to instantiate, configure, control, and/or use a probe that can capture data associated with the logical node 108 without capturing the internal traffic $T_i$. Some embodiments of these concepts and technologies will be further described below.

In the illustrated embodiment shown in FIG. 1, the data center server 112 also participates in data communications that originate or are destined for an external resource 122 that is located outside of the logical node 108. More particularly, the external resource 122 can be located outside of the data center that hosts the logical node 108. As such, traffic between the data center server 112 and the external resource 122, referred to herein as "external traffic $T_e$," can entail ingress and/or egress to and/or from the data center that hosts the logical node 108. Such external traffic $T_e$ may be of interest to an entity that requests and/or is entitled to traffic monitoring associated with the logical node 108 and/or one or more data centers that host the logical node 108. Thus, it can be appreciated that embodiments of the concepts and technologies described herein enable the probe orchestrator service 106 to instantiate, configure, control, and/or use a probe that can capture the external traffic $T_e$ associated with the logical node 108 without capturing the internal traffic $T_i$.

To provide the functionality illustrated and described herein, the probe orchestrator service 106 can obtain traffic monitoring data 124 that describes traffic associated with the logical node 108. The traffic monitoring data 124 can be provided to or obtained by the probe orchestrator service 106 in a number of manners. In the illustrated embodiment, the operating environment 100 includes a traffic monitor 126. The traffic monitor can be configured to monitor any traffic that involves the logical node 108. As such, the traffic monitor 126 can be configured to detect internal traffic $T_i$ and external traffic $T_e$ associated with the logical node 108. In some embodiments, the traffic monitor 126 can be located within the logical node 108 and therefore the logical node 108 can be self-reporting to the probe orchestrator service 106, and therefore may generate the traffic monitoring data 124.

In some embodiments of the concepts and technologies described herein, the traffic monitor 126 can be configured to detect all traffic occurring via all physical network ports associated with the data center and/or the logical node 108. The traffic monitor 126 therefore can be configured to determine, based upon an analysis of the traffic that involves the data center and/or the logical node 108, that the logical node 108 creates traffic that leaves the logical node 108 and/or the data center, that the external traffic $T_e$ receives the external traffic $T_e$ from a resource outside of the logical node 108 and/or the data center (e.g., the external resource 122), and/or that the logical node 108 is otherwise involved in traffic such as the external traffic $T_e$. Based upon this determination, the traffic monitor 126 can provide the traffic monitoring data 124 to the probe orchestrator service 106.

In some other embodiments, the traffic monitor 126 can create the traffic monitoring data 124 and provide the traffic monitoring data 124 to the probe orchestrator service 106. The probe orchestrator service 106 can analyze the traffic monitoring data 124 and determine, based upon the analysis of the traffic monitoring data 124, that the logical node 108 creates traffic that leaves the logical node 108 and/or the data center, that the external traffic $T_e$ receives the external traffic $T_e$ from a resource outside of the logical node 108 and/or the data center (e.g., the external resource 122), and/or that the logical node 108 is otherwise involved in traffic such as the external traffic $T_e$. Based upon this determination (or receiving the traffic monitoring data 124 as discussed above), the probe orchestrator service 106 can determine that a virtual probe is to be instantiated in accordance with the concepts and technologies described herein.

In addition to determining that a virtual probe is to be instantiated, the probe orchestrator service 106 can determine where the virtual probe is to be located. In particular, the probe orchestrator service 106 can determine what resources are involved with traffic that leaves a data center and/or the logical node 108 and identify those resources as resources that are to be monitored by the virtual probe. In the example embodiment shown in FIG. 1, the probe orchestrator service 106 can determine that the second data center server 112 is to be monitored using the virtual probe. It should be understood that this example is illustrative and therefore should not be construed as being limiting in any way.

Based upon this, or other, determinations, the probe orchestrator service 106 can generate one or more command 128. The command 128 can instruct a device that receives the command 128 (or a device specified in the command 128) to instantiate a virtual probe 130. The virtual probe 130 can selectively monitor traffic at a particular resource to capture only external traffic $T_e$. It should be understood that this example is illustrative and therefore should not be construed as being limiting in any way.

According to various embodiments of the concepts and technologies described herein, the command 128 can be provided by the probe orchestrator service 106 to a particular resource to instantiate the virtual probe 130. In the example embodiment shown in FIG. 1, the command 128 is shown being provided to the second data center server 112 because the second data center server 112 engages in external traffic $T_e$. It should be understood that this example is illustrative and therefore should not be construed as being limiting in any way.

The second data center server 112 can, upon receiving the command 128, execute the command 128 to instantiate the virtual probe 130. In some other embodiments, the probe orchestrator service 106 can, in conjunction with a virtual machine orchestrator and/or a software defined networking ("SDN") orchestrator, trigger instantiation of the virtual probe 130 at the second data center server 112. Regardless of how the instantiation of the virtual probe 130 is triggered, the virtual probe 130 can be instantiated at the second data center server 112 or other device that engages in external traffic $T_e$.

According to various embodiments of the concepts and technologies described herein, the virtual probe 130 can be instantiated within the host OS 118 of the second data center server 112. Thus, the virtual probe 130 can be configured by the host OS 118 to capture all data that is being communicated to or from outside of the logical node 108 and/or the data center (e.g., with the external resource 122).

The virtual probe 130 can be configured to capture the traffic associated with the external traffic $T_e$. The virtual probe 130 can package the captured traffic and/or data that represents the captured traffic as external traffic data 132. The virtual probe 130 can be configured to cause the second data center server 112 to transmit the external traffic data 132 to one or more recipient. In some embodiments, the recipient can include the probe orchestrator service 106. In some other embodiments, the recipient can include an external traffic data recipient 134 such as a monitoring application, a monitoring service, a hardware device, a reporting device, combinations thereof, or the like.

The probe orchestrator service 106 also can be configured to configure the virtual probe 130 before or after the virtual probe 130 is active. In some embodiments, for example, the virtual probe 130 can be configured to use one or more filters from a catalog of known logical interface descriptions. Thus, for example, the virtual probe 130 could be configured to capture data associated with a particular interface of a particular resource (e.g., the second data center server 112). It should be understood that this example is illustrative and therefore should not be construed as being limiting in any way. The virtual probe 130 also can be configured to operate in conjunction with the data plane development kit ("DPDK") and/or single root input/output virtualization ("SRIOV") for efficiency. According to various embodiments, the probe orchestrator service 106 can issue one or more commands 128 to configure the virtual probe 130. Because the virtual probe 130 can be configured in additional and/or alternative manners, it should be understood that these examples are illustrative and therefore should not be construed as being limiting in any way.

In some other contemplated embodiments of the concepts and technologies described herein, the probe orchestrator service 106 can be configured to create the virtual probes 130 at other times and/or upon consideration of other types of information. In some contemplated embodiments, for example, the probe orchestrator service 106 can obtain, from a repository, a database, an inventory, and/or from other devices or entities, one or more virtual machine creation templates 136. The virtual machine creation templates 136 can be used by the probe orchestrator service 106 (or another orchestrator) as part of a virtual machine startup or initiation process. Thus, for example, the probe orchestrator service 106 can operate as a plugin or supplement for an orchestrator, and as such the creation of the virtual probe 130 and/or the associated analysis to determine that the virtual probe 130 is to be created can be performed at virtual machine creation and/or virtual machine instantiation time by an orchestrator and/or an associated probe orchestrator service 106 (or plugin that provides the functionality of the probe orchestrator service 106 as illustrated and described herein). It should be understood that this example is illustrative and therefore should not be construed as being limiting in any way.

Thus, it can be appreciated that an orchestrator or other device or entity that can provide the functionality illustrated and described herein for the probe orchestrator service 106 can be configured to determine, at virtual machine creation or instantiation time, what virtual machines and/or interfaces of a particular logical node 108 will host internal and/or external traffic. The virtual machine creation templates 136 can describe the virtual machines, the interfaces, and/or networks via descriptive information included in the virtual machine creation templates 136. Thus, the probe orchestrator service 106 (or similar functionality of an orchestrator) can analyze the virtual machine creation templates 136 to identify virtual machines and/or interfaces that carry external and/or internal traffic.

Also, it can be appreciated that in some embodiments of the concepts and technologies described herein, IP addresses of interfaces that carry internal traffic can differ (e.g., can be in ranges that differ) from IP addresses of interfaces that carry external traffic. Thus, some embodiments of the concepts and technologies described herein analyze IP addresses of virtual machines and/or virtual machine interfaces of virtual machines in the logical node 108 to identify virtual machines and/or interfaces that carry internal and/or external traffic. It should be understood that this example is illustrative and therefore should not be construed as being limiting in any way.

In practice, a logical node 108 of resources such as data center servers 110, 112 can be created or dedicated to provide particular functionality (e.g., a cloud service, a data center, an application, a system, combinations thereof, or the like). The logical node 108 can include at least one server that can create, receive, and/or otherwise engage in communications (e.g., traffic) that leaves the logical node 108. As such, the logical node 108 can include at least one data center server 110, 112 that can be involved in external traffic $T_e$. In some embodiments, the logical node 108 can include at least two data center servers 110, 112. The data center servers 110, 112 can exchange internal traffic $T_i$ and at least one of the data center servers 110, 112 can be involved in the external traffic $T_e$. According to various embodiments, the external traffic $T_e$ can involve at least one resource that is remote from the logical node 108 such as, for example, the external resource 122.

A traffic monitor 126 can monitor traffic that involves the logical node 108 in any way. As such, the traffic monitor 126 can monitor the internal traffic $T_i$ and the external traffic $T_e$. In some other embodiments, a device within the logical node 108 can monitor the traffic associated with the logical node 108. Regardless of what entity monitors the traffic, traffic monitoring data 124 can be generated by the entity and provided to a device that hosts a probe orchestrator service 106, for example the server computer 102. The probe orchestrator service 106 can analyze the traffic monitoring data 124 and determine that a virtual probe 130 is to be instantiated to capture the external traffic $T_e$ associated with the logical node 108.

The probe orchestrator service 106 can generate or trigger generation of one or more commands 128 to instantiate a virtual probe 130 within the logical node 108. According to various embodiments of the concepts and technologies described herein, the virtual probe 130 can be instantiated within a host OS 118 of the data center server 112 that is involved in external traffic $T_e$ that leaves the logical node 108. It should be understood that this example is illustrative and therefore should not be construed as being limiting in any way. The resource that receives the command 128, or a resource specified by the command 128, can instantiate the virtual probe 130. The virtual probe 130 can monitor the external traffic $T_e$, package information relating to the external traffic $T_e$ as external traffic data 132, and provide the external traffic data 132 to a recipient such as the probe orchestrator service 106 or an external traffic data recipient 134.

FIG. 1 illustrates one server computer 102; one network 104; one logical node 108; two data center servers 110, 112; one external resource 122; one traffic monitor 126; and one external traffic data recipient 134. It should be understood, however, that various implementations of the operating environment 100 can include zero, one, or more than one server computer 102; zero, one, or more than one network 104; zero, one, or more than one logical node 108; one, two, or more than two data center servers 110, 112; one or more than one external resource 122; zero, one, or more than one traffic monitor 126; and/or zero, one, or more than external traffic data recipient 134. As such, the illustrated embodiment should be understood as being illustrative, and should not be construed as being limiting in any way.

Figure 2:
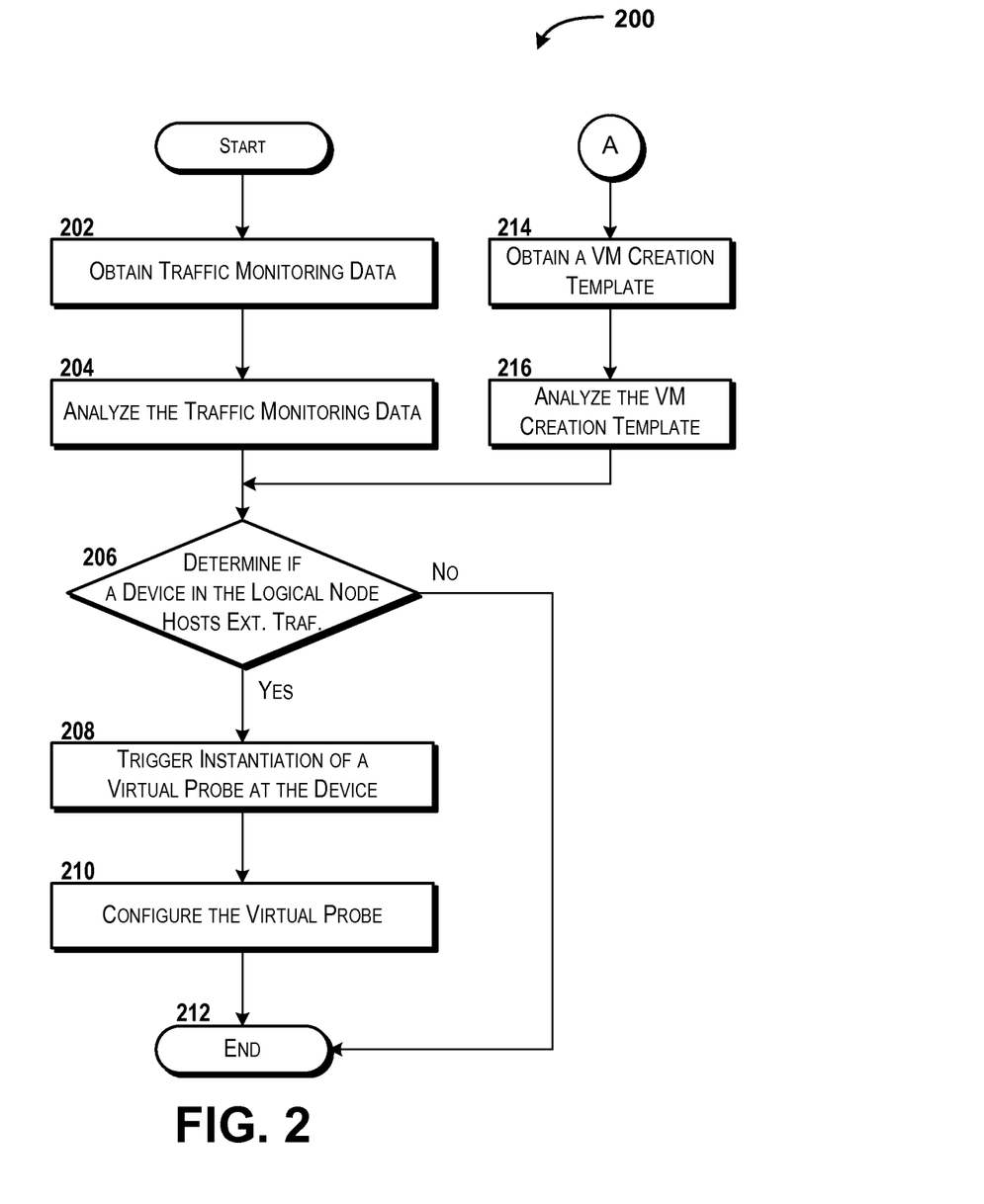
FIG. 2 is a flow diagram showing aspects of a method for using a virtual probe, according to an illustrative embodiment of the concepts and technologies described herein.

Turning now to FIG. 2, aspects of a method 200 for using a virtual probe will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 and/or a data center server 110, 112, to perform one or more operations and/or causing the processor to direct other components of the computing system or device to perform one or more of the operations.

For purposes of illustrating and describing the concepts of the present disclosure, the method 200 disclosed herein is described as being performed by the server computer 102 via execution of one or more software modules such as, for example, the probe orchestrator service 106. It should be understood that additional and/or alternative devices and/or network nodes can provide the functionality described herein via execution of one or more modules, applications, and/or other software including, but not limited to, the probe orchestrator service 106. Thus, the illustrated embodiment is illustrative, and should not be viewed as being limiting in any way.

The method 200 begins at operation 202. At operation 202, the server computer 102 can obtain traffic monitoring data. In some embodiments, for example, the server computer 102 can obtain the traffic monitoring data 124 illustrated and described above with reference to FIG. 1. According to various embodiments of the concepts and technologies described herein, the traffic monitoring data 124 can be received by the server computer 102 from a traffic monitoring device such as the traffic monitor 126, from a device within the logical node 108, and/or from other devices or entities.

The traffic monitoring data 124 can describe or represent traffic that is occurring (or that has occurred) within the logical node 108 and/or devices within the logical node 108, as well as traffic that is occurring (or that has occurred) between the logical node 108 and/or devices within the logical node 108 and at least one device or entity outside of the logical node (e.g., the external resource 122). In some other embodiments, the traffic monitoring data 124 can describe only traffic that is occurring (or that has occurred) between the logical node 108 and/or devices within the logical node 108 and at least one device or entity outside of the logical node (e.g., the external resource 122). The traffic monitoring data 124 can be provided in any format or protocol.

From operation 202, the method 200 proceeds to operation 204. At operation 204, the server computer 102 can analyze the traffic monitoring data 124. In some embodiments, the analysis performed by the server computer 102 in operation 204 can be performed to determine, based upon the traffic monitoring data 124, if any traffic engaged in by devices within the logical node 108 involves any devices outside of the logical node 108 (e.g., if any of the traffic includes external traffic $T_e$). It should be understood that this example is illustrative and therefore should not be construed as being limiting in any way.

In some embodiments, if the server computer 102 determines that any of the traffic associated with the logical node 108 includes the external traffic $T_e$, the analysis performed by the server computer 102 in operation 204 can also be performed to determine, based upon the traffic monitoring data 124, which of the devices within the logical node 108 are involved in the external traffic $T_e$. Thus, for example, the server computer 102 may determine, in operation 204, that the traffic monitoring data 124 indicates that at least one device associated with the logical node 108 is involved in external traffic $T_e$, and that the device is a particular device such as, for example, the second data center server 112. It should be understood that this example is illustrative and therefore should not be construed as being limiting in any way.

From operation 204, the method 200 proceeds to operation 206. At operation 206, the server computer 102 can determine, based upon the analysis performed in operation 204, if a device in the logical node 108 is involved in external traffic $T_e$. It can be appreciated that the functionality of operations 204 and 206 may be combined, in some embodiments of the concepts and technologies described herein. If the server computer 102 determines, in operation 206, that a device in the logical node 108 is involved in external traffic $T_e$, the method 200 can proceed to operation 208.

At operation 208, the server computer 102 can trigger instantiation of a virtual probe (e.g., the virtual probe 130) at the device that is determined to be involved in the external traffic $T_e$. According to various embodiments of the concepts and technologies described herein, the server computer 102 can generate a command (e.g., the command 128) in operation 208 and issue the command 128 to the device as part of operation 208. According to some other embodiments, the server computer 102 can notify or trigger other devices (e.g., a virtual machine orchestrator and/or an SDN orchestrator) that the virtual probe 130 should be instantiated, and those devices can instantiate the virtual probe 130 at the device. Regardless of what device(s) instantiate the virtual probe 130 at the device, various embodiments of the concepts and technologies described herein include the server computer 102 triggering the instantiation of the virtual probe 130 based upon the analysis and determination performed in operations 204-206. It should be understood that this example is illustrative and therefore should not be construed as being limiting in any way.

From operation 208, the method 200 proceeds to operation 210. At operation 210, the server computer 102 can configure the virtual probe 130 at the device. Thus, the server computer 102 can be configured to remotely configure the virtual probe 130. According to various embodiments, the server computer 102 can access a library or catalog of known logical interface descriptions for various physical network interfaces. Using that library or catalog, the server computer 102 can configure the virtual probe 130 remotely. The server computer 102 also can use development kits and/or virtualization packages to configure the virtual probe 130 remotely. Regardless of which approach is used by the server computer 102, various embodiments of the concepts and technologies described herein enable remote configuration of the virtual probe 130 at instantiation time and/or at some other time. In practice, it should be understood that the server computer 102 can configure the virtual probe at any time. It should be understood that this example is illustrative and therefore should not be construed as being limiting in any way.

From operation 210, the method 200 proceeds to operation 212. The method 200 also can proceed to operation 212 from operation 206 if the server computer 102 determines, in operation 206, that a device in the logical node 108 is not involved in external traffic $T_e$. The method 200 can end at operation 212.

In some embodiments of the concepts and technologies described herein, the method 200 can begin at an alternative start point (labeled "A" in FIG. 2) and proceed to operation 214 to perform an embodiment of the method 200 that uses virtual machine creation templates 136 instead of, or in addition to, traffic monitoring data 124. At operation 214, the server computer 102 can obtain one or more virtual machine creation template 136. As explained above, the virtual machine creation templates 136 can be obtained by the server computer 102 from a virtual machine creation template repository, database, data storage device, and/or other entity.

The virtual machine creation templates 136 can describe or represent virtual machines and/or virtual machine interfaces that are to be created as part of a logical node 108. In some embodiments, as explained above with reference to FIG. 1, the server computer 102 can host an orchestrator for creating and/or instantiating virtual machines, and the probe orchestrator service 106 can operate as a plug-in for the orchestrator and/or the orchestrator can include the functionality illustrated and described herein for the probe orchestrator service 106. The virtual machine creation template 136 can be obtained in any format or protocol.

From operation 214, the method 200 proceeds to operation 216. At operation 216, the server computer 102 can analyze the virtual machine creation template 136. In some embodiments, the analysis performed by the server computer 102 in operation 216 can be performed to determine, based upon the virtual machine creation template 136, which virtual machines and/or interfaces of a logical node 108 are to engage in, support, and/or otherwise involve traffic that goes to, comes from, and/or involves any devices outside of the logical node 108 (e.g., if the virtual machine or interface hosts or supports any external traffic $T_e$). Thus, the server computer 102 can determine, based upon a virtual machine creation template 136, that the virtual machine and/or its associated interfaces hosts internal traffic, external traffic, and/or a combination thereof.

From operation 216, the method 200 can proceed to operation 206, and the method 200 can proceed as illustrated and described above. Thus, operations 206-212 can be performed by the server computer 102 and a virtual probe 130 can be instantiated and used. The method 200 can again end at operation 212.

Figure 3:
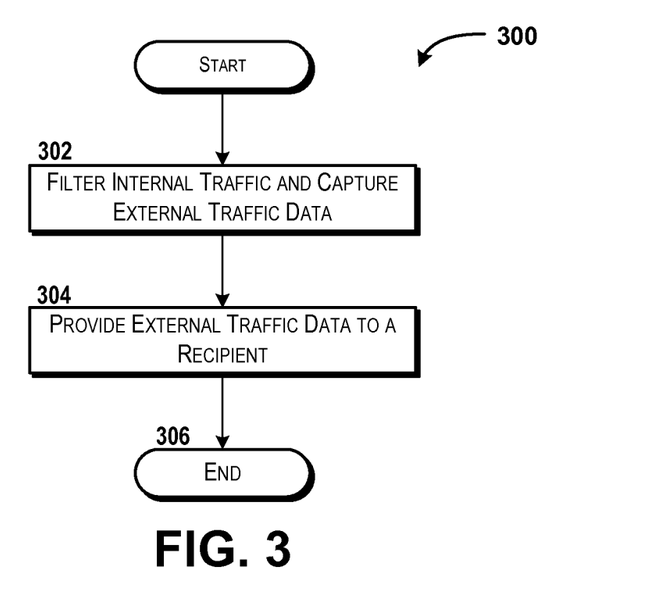
FIG. 3 is a flow diagram showing aspects of a method for generating external traffic data using a virtual probe, according to an illustrative embodiment of the concepts and technologies described herein.

Turning now to FIG. 3, aspects of a method 300 for generating external traffic data will be described in detail, according to an illustrative embodiment. For purposes of illustrating and describing the concepts of the present disclosure, the method 300 disclosed herein is described as being performed by the data center server 112 via execution of one or more software modules such as, for example, the virtual probe 130. It should be understood that additional and/or alternative devices and/or network nodes can provide the functionality described herein via execution of one or more modules, applications, and/or other software including, but not limited to, the virtual probe 130. Thus, the illustrated embodiment is illustrative, and should not be viewed as being limiting in any way.

The method 300 begins at operation 302. At operation 302, the data center server 112 can filter internal traffic $T_i$ and capture external traffic data 132. As explained above, the internal traffic $T_i$ can include traffic that is internal to the logical node 108 and therefore does not involve any device or entity that is outside of the logical node 108. In capturing the external traffic data 132, the data center server 112 can capture information that relates to traffic that involves any device or entity that is outside of the logical node 108.

Because the virtual probe 130 can be configured to execute within the host OS 118 of the data center server 112, the virtual probe 130 can detect traffic that leaves the logical node 108 and/or comes from outside of the logical node 108. Because the virtual probe 130 may determine that traffic leaves the logical node 108 and/or comes from outside of the logical node 108 in additional and/or alternative manners, it should be understood that this example is illustrative and therefore should not be construed as being limiting in any way.

From operation 302, the method 300 proceeds to operation 304. At operation 304, the data center server 112 can provide the external traffic data 132 captured in operation 302 to a recipient such as the external traffic data recipient 134. In some embodiments, as explained above, the data center server 112 can provide the external traffic data 132 to the server computer 102. Because the external traffic data 132 can be provided to any entity identified by the virtual probe 130 and/or may be provided to no other entities, it should be understood that these examples are illustrative and therefore should not be construed as being limiting in any way.

From operation 304, the method 300 proceeds to operation 306. The method 300 can end at operation 306.

Figure 4:
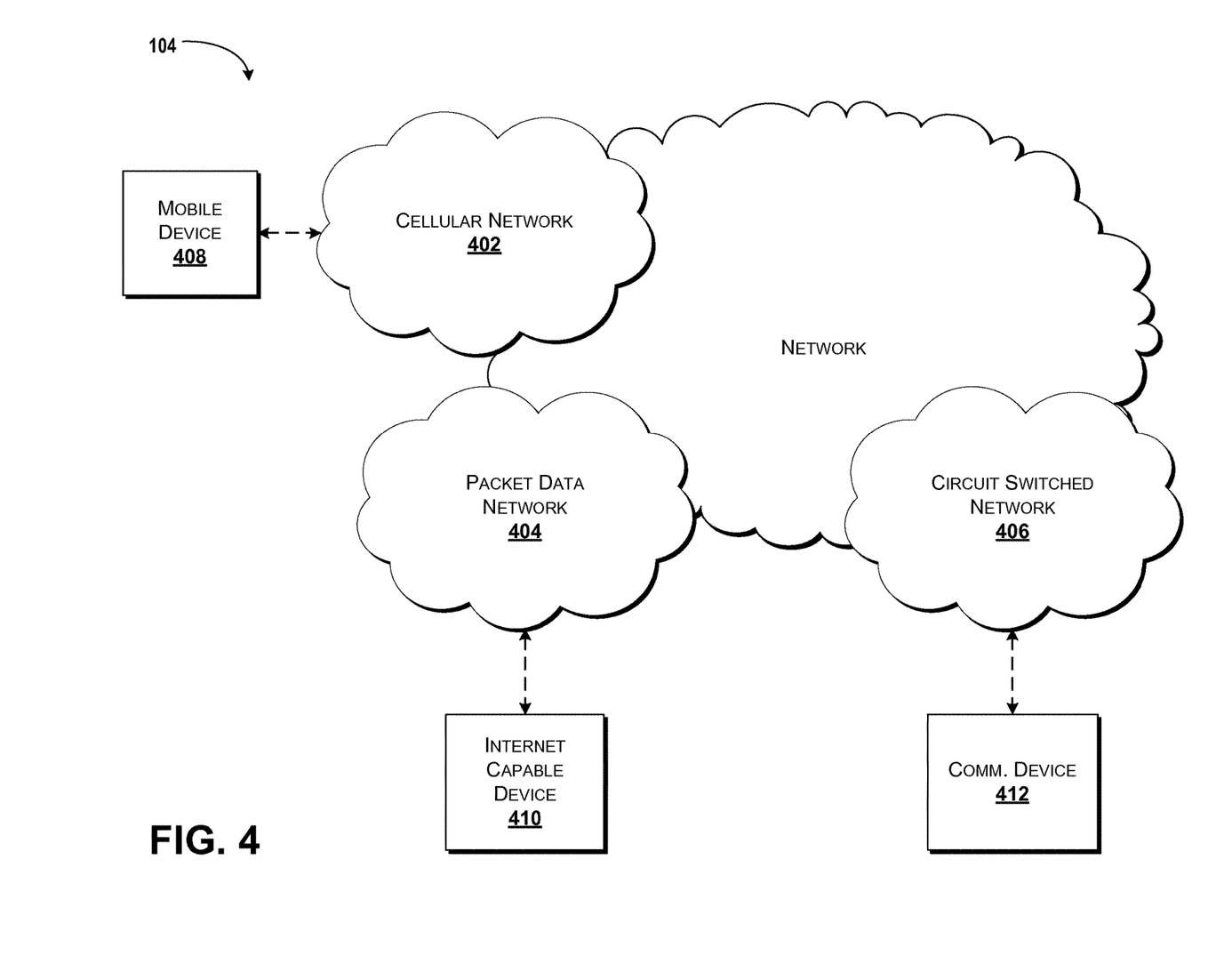
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MME5"), short message service centers ("SMSCs"), multimedia messaging service centers ("MMSCs"), home location registers ("HLR5"), home subscriber servers ("HSSs"), visitor location registers ("VLR5"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
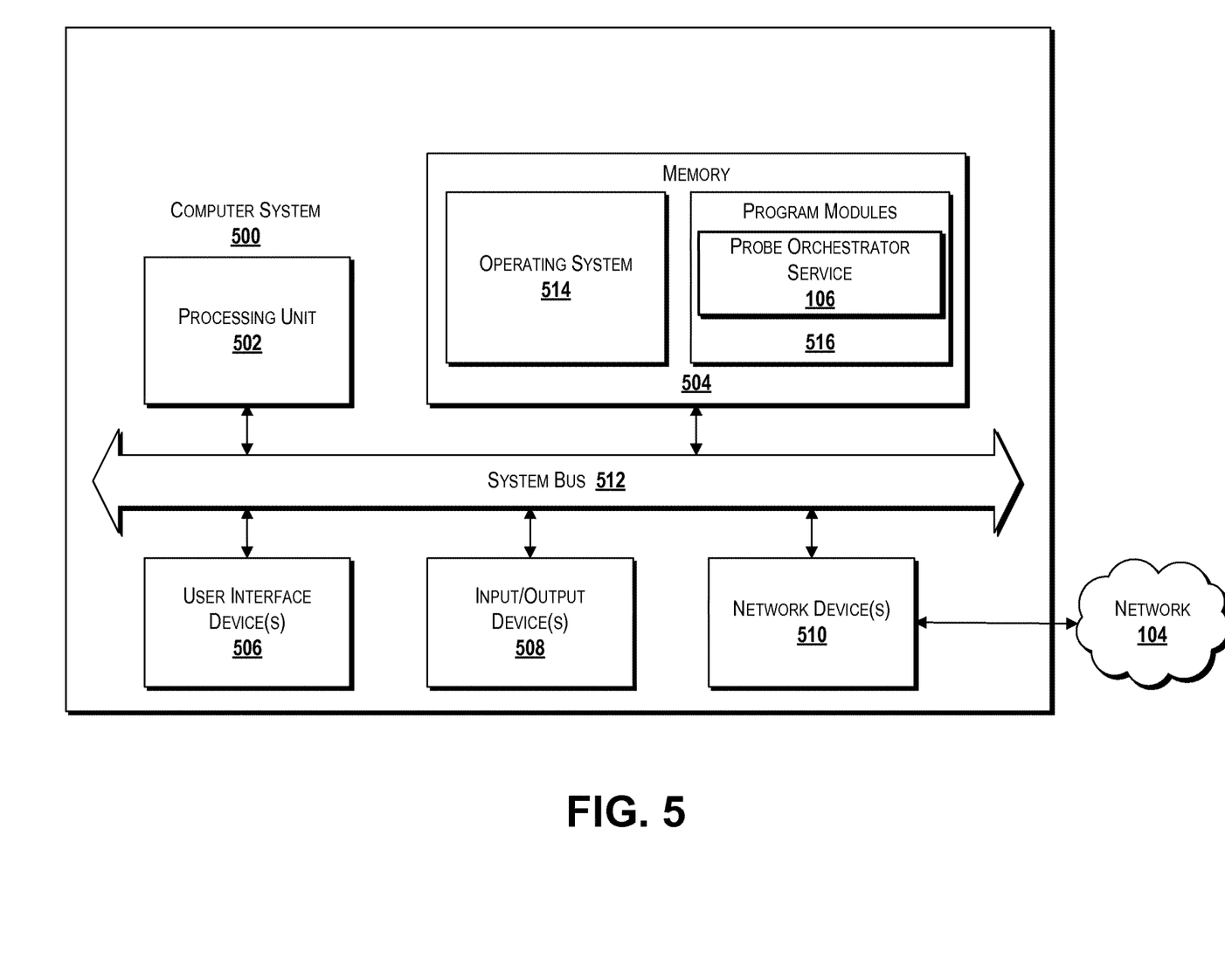
FIG. 5 is a block diagram illustrating an example computer system configured to create and use virtual probes, according to some illustrative embodiments of the concepts and technologies described herein.

FIG. 5 is a block diagram illustrating a computer system 500 configured to provide the functionality described herein for creating, configuring, and using virtual probes, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the probe orchestrator service 106, the host OS 118, the virtual probe 130, or the like. These and/or other programs can be embodied in computer-readable media containing instructions that, when executed by the processing unit 502, perform one or more of the methods 200, 300 described in detail above with respect to FIGS. 2-3. According to embodiments, the program modules 516 may be embodied in hardware, software, firmware, or any combination thereof. Although not shown in FIG. 5, it should be understood that the memory 504 also can be configured to store the virtual machine 120, traffic monitoring data 124, the command 128, the external traffic data 132, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for creating, configuring, and using virtual probes have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
    obtaining, at a processor executing a probe orchestrator service, data that describes traffic associated with a logical node, wherein the logical node comprises a plurality of servers that are located within a data center, and wherein the plurality of servers exchange information within the data center as internal traffic;
    analyzing, by the processor, the data to determine if a server of the plurality of servers hosts external traffic, wherein the external traffic comprises communications with an external device that resides outside of the logical node and outside of the data center;
    in response to a determination that the server of the plurality of servers hosts the external traffic, triggering, by the processor, instantiation of a virtual probe at the server of the plurality of servers, wherein the virtual probe is instantiated within a host operating system of the server of the plurality of servers, wherein the virtual probe reports to a recipient regarding the external traffic, and wherein the recipient is outside of the logical node; and
    configuring the virtual probe, wherein configuring the virtual probe comprises accessing a catalog of known logical interface descriptions of physical network interfaces of the server of the plurality of servers, and configuring the virtual probe to use a filter from the catalog.

2. The method of claim 1, wherein the recipient comprises the probe orchestrator service.

3. The method of claim 1, wherein the data comprises a virtual machine creation template.

4. The method of claim 1, wherein the server hosts a virtual machine that provides functionality associated with a service.

5. The method of claim 1, wherein triggering instantiation of the virtual probe comprises sending, to the server of the plurality of servers, a command to instantiate the virtual probe.

6. The method of claim 5, wherein the command to instantiate the virtual probe comprises instructions to configure the virtual probe.

7. The method of claim 1, wherein the external traffic hosted by the server of the plurality of servers comprises an exchange of data by the server of the plurality of servers with an external resource that is located outside of the logical node.

8. The method of claim 1, further comprising:
    receiving, by the processor and from the virtual probe, external traffic data that describes the external traffic that is hosted by the server of the plurality of servers.

9. A system comprising:
    a processor; and
    a memory that stores computer-executable instructions that, when executed by the processor, cause the processor to perform operations comprising
        obtaining data that describes traffic associated with a logical node, wherein the logical node comprises a plurality of servers are located within a data center, and wherein the plurality of servers exchange information within the data center as internal traffic,
        analyzing the data to determine if a server of the plurality of servers hosts external traffic, wherein the external traffic comprises communications with an external device that resides outside of the logical node and outside of the data center,
        in response to a determination that the server of the plurality of servers hosts the external traffic, triggering instantiation of a virtual probe at the server of the plurality of servers, wherein the virtual probe is instantiated within a host operating system of the server of the plurality of servers, wherein the virtual probe reports to a recipient regarding the external traffic, and wherein the recipient is outside of the logical node; and
        configuring the virtual probe, wherein configuring the virtual probe comprises accessing a catalog of known logical interface descriptions of physical network interfaces of the server of the plurality of servers, and configuring the virtual probe to use a filter from the catalog.

10. The system of claim 9, wherein the recipient comprises a probe orchestrator service.

11. The system of claim 9, wherein the data comprises a virtual machine creation template.

12. The system of claim 9, wherein triggering instantiation of the virtual probe comprises sending, to the server of the plurality of servers, a command to instantiate the virtual probe.

13. The system of claim 12, wherein the command to instantiate the virtual probe comprises instructions to configure the virtual probe.

14. A computer storage medium having computer-executable instructions stored thereon that, when executed by a processor, cause the processor to perform operations comprising:

obtaining data that describes traffic associated with a logical node, wherein the logical node comprises a plurality of servers that are located within a data center, and wherein the plurality of servers exchange information within the data center as internal traffic;

analyzing the data to determine if a server of the plurality of servers hosts external traffic, wherein the external traffic comprises communications with an external device that resides outside of the logical node and outside of the data center;

in response to a determination that the server of the plurality of servers the external traffic, triggering instantiation of a virtual probe at the server of the plurality of servers, wherein the virtual probe is instantiated within a host operating system of the server of the plurality of servers, wherein the virtual probe reports to a recipient regarding the external traffic, and wherein the recipient is outside of the logical node; and configuring the virtual probe, wherein configuring the virtual probe comprises accessing a catalog of known logical interface descriptions of physical network interfaces of the server of the plurality of servers, and configuring the virtual probe to use a filter from the catalog.

15. The computer storage medium of claim 14, wherein the recipient comprises a probe orchestrator service.

16. The computer storage medium of claim 14, wherein the data comprises a virtual machine creation template.

17. The computer storage medium of claim 14, wherein triggering instantiation of the virtual probe comprises sending, to the server of the plurality of servers, a command to instantiate the virtual probe, and wherein the command to instantiate the virtual probe comprises instructions to configure the virtual probe.

\* \* \* \* \*